May 1, 1934.  J. C. McMULKIN ET AL  1,957,030

PRESSURE GAUGE AND MINIMUM PRESSURE INDICATOR

Filed Oct. 19, 1932  2 Sheets-Sheet 1

INVENTOR
James C. McMulkin.
Philip M. Hammett.
BY Darby & Darby
ATTORNEYS.

May 1, 1934.  J. C. McMULKIN ET AL  1,957,030
PRESSURE GAUGE AND MINIMUM PRESSURE INDICATOR
Filed Oct. 19, 1932  2 Sheets-Sheet 2
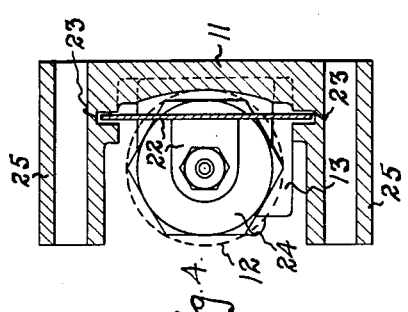
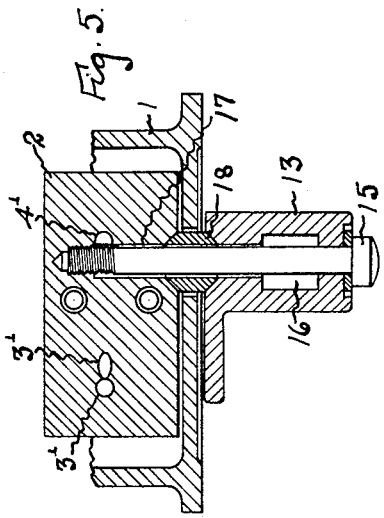
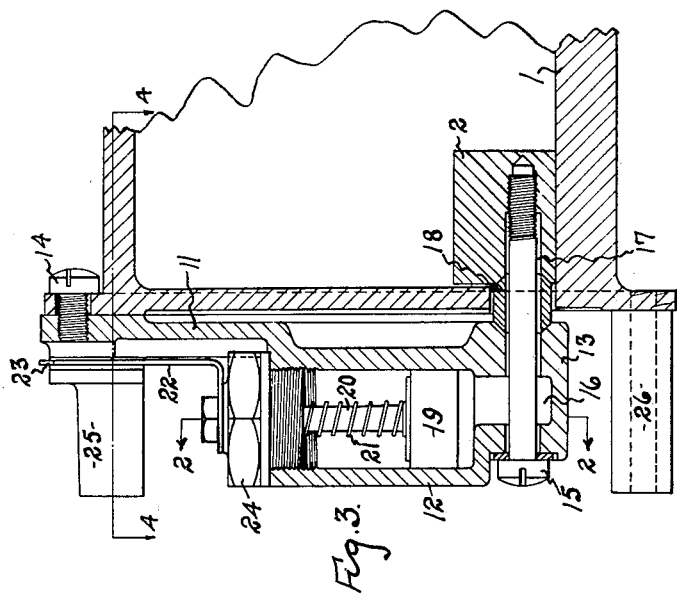
INVENTOR
James C. McMulkin
Philip M. Hammett
BY
ATTORNEYS Patented May 1, 1934

1,957,030

UNITED STATES PATENT OFFICE 1,957,030

PRESSURE GAUGE AND MINIMUM PRESSURE INDICATOR

James C. McMulkin, Woodfords, Maine, and Philip M. Hammett, Long Island City, N. Y., assignors to Consolidated Ashcroft Hancock Company, Inc., Bridgeport, Conn., a corporation of Delaware Application October 19, 1932, Serial No. 638,570

1 Claim. (Cl. 73—109)

This invention involves fluid pressure gauges and indicating means.

One of the objects of this invention is to provide in combination with a fluid pressure gauge of a minimum pressure, tell-tale device for indicating pressure below that which will operate the pressure gauge.

A further object of this invention is to provide in combination with a fluid pressure source and a piping system, a duplex pressure gauge and a minimum pressure indicator for indicating pressure in the piping system below that to which the gauge is sensitive.

A further object of this invention is to provide in combination with a fluid pressure source and a piping system, a duplex pressure gauge for indicating the pressure of the source and for indicating the pressure in the piping system and a minimum pressure indicator for indicating pressures in a portion of the piping system below that to which the gauge is sensitive.

A still further object of this invention is to provide in a simplified construction, a single or duplex pressure gauge having as a part thereof, a minimum pressure indicator.

These and many other objects as will appear from the following disclosure are secured by means of this invention.

This invention resides substantially in the combination, construction, arrangement and relative location of parts, all as will be described in detail in the following specification and pointed out in the appended claim.

Referring to the drawings:

Fig. 3 is a vertical cross-sectional view taken on the line 3—3 of Fig. 1, with the operating mechanism of the duplex gauge omitted;

Fig. 4 is a cross sectional view taken on the line 4—4 of Fig. 3;

Fig. 5 is a cross-sectional view taken on the line 5—5 of Fig. 2;

Figure 2:
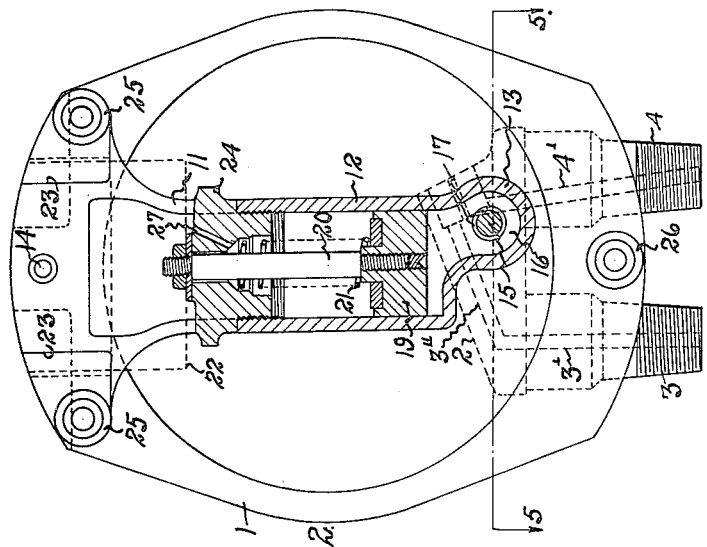
Fig. 2 is a rear elevational view of the gauge showing the minimum pressure indicator in cross-sectional view on the line 2—2 of Fig. 3.

At the outset it should be noted that the minimum pressure indicator of this device is not limited to use with a duplex pressure gauge since it may be employed in conjunction with any well known type of pressure gauge. It is likewise apparent that the indicating portion of this invention is not limited to use with a piping system such as disclosed in Figure 1 for purposes of illustration.

In the operation of the brakes of vehicles, it is common to employ a duplex pressure gauge which includes two independent indicating systems, one of which indicates at all times, the pressure of the fluid pressure source and the other of which indicates the pressure of the fluid in the piping system or brake line connected to the fluid pressure source.

The brake control valve is connected in the brake line at a point between the connections of the gauge so that one of the hands of the gauge indicates the pressure of the source at all times and the other hand of the gauge indicates the varying pressure conditions in the brake line. Such gauges as now employed in this art are not very sensitive in the lower pressure ranges and normally do not indicate pressures of from one to two pounds above atmospheric pressure. If the Bourdon tube or other pressure responsive device is made light enough to be sensitive to these low pressures it would not be strong enough to withstand the higher pressures encountered in its use. If the brake valve of a vehicle braking system is leaking so that when the brakes are released and the valve is closed some fluid pressure leaks into the brake line, this pressure will act to apply the brakes slightly but with sufficient pressures to produce undesired wear of the brake shoes. The ordinary pressure gauge used in conjunction with such system not indicating these low pressures, is incapable of indicating to the vehicle operator that there is a slight undesirable pressure in the brake line.

A general object of this invention is to provide, as a supplement to the usual pressure gauge, a minimum pressure indicator for indicating slight pressures of the order of two pounds so as to notify the operator of this undesirable condition.

Another object of this invention is to combine such a minimum pressure indicator with the pressure gauge whether it be of the duplex type or of some other type to provide a simplified unitary structure for overcoming the above undesired conditions in connection with vehicle brake apparatus and other fluid pressure systems.

Referring now in detail to the drawings the pressure gauge is shown comprising a casing 1 within which is mounted a fitting member 2. At 3 and 4 are the threaded connecting nipples by means of which the gauge is connected to the piping system. The fitting 2 and the nipples 3 and 4 have the passages 3' and 3'' and 4'. Attached to the fitting 2 so as to be in communication with the passage 3'' is a Bourdon tube 5. A second Bourdon tube 6 is connected to the fitting 2 so as to be in communication with passage 4'. The independent connecting mechanism which interconnects the indicator hand operating shafts is indicated generally at 7 and need not be referred to in further detail here since by itself it involves no part of this invention. At 8 and 9 are the indicator hands which are operated by the Bourdon tubes 5 and 6 and the interconnecting operation mechanism. These hands operate over a dial 10 having a suitable scale or scales on the face thereof.

Secured to the seal of casing 1 is a plate 11 which is formed integral with a small cylinder 12 having an integral extension 13 within which a chamber 16 is formed. The plate and cylinder and its extension are secured to the back of the gauge casing by means of the machine bolts 14 and 15. The bolt 15 passes through the extension 13 through a passage which is slightly larger than the bolt and is a continuation of the passage 17 in the fitting 2 and the passage in the sealing ring 18. The sealing ring 18 forms an air tight connection between the extension 13 and the fitting 2.

At 19 is a piston within the cylinder 12 provided with a piston rod 20 which passes through the removable plug 24 which forms a closure for the upper end of the cylinder. A light spring 21 encircles the piston rod 20 and lies between the piston and the plug so as to normally hold the piston in the position shown. Clamped to the upper end of the piston rod, as is clear from Fig. 2, is an ear formed integral with the indicating vane 22. This vane 22 is vertically slidable in guides 23 in the upper part of plate 11. As is clear from Fig. 4 this plate is provided with a pair of apertured legs 25 which, in conjunction with the collar or sleeve 26, provide means for spacing the gauge casing 1 away from any support to which it is attached so as to provide space for the mechanism attached to the back of the casing 1. It will be noted from Fig. 5 that the passage 4' in the nipple 4 and the fitting 2, in extending to the Boudon tube 5, intersects the passage 17 so that whenever a fluid pressure medium enters passage 4' it enters the passage 17 around bolt 15 and is thus delivered to chamber 16 and cylinder 12 below piston 19. It should also be noted in Fig. 2 that the plug 24 is provided with a port 27 opening into the atmosphere so that the cylinder 12 will not be air bound above the piston 19 so as to interfere with its movement. One suitable type of system in conjunction with which the device of this invention may be used, is diagrammatically illustrated in Figure 1. At 30 is a fluid pressure source such as a tank which is connected by pipe 31 to a brake control valve 32 which in turn is connected by a pipe 33 to the brake cylinder 34. Pipe 31 is connected by a branch pipe 35 to the nipple 3 and pipe 33 is connected by a branch pipe 36 to the nipple 4.

Figure 1:
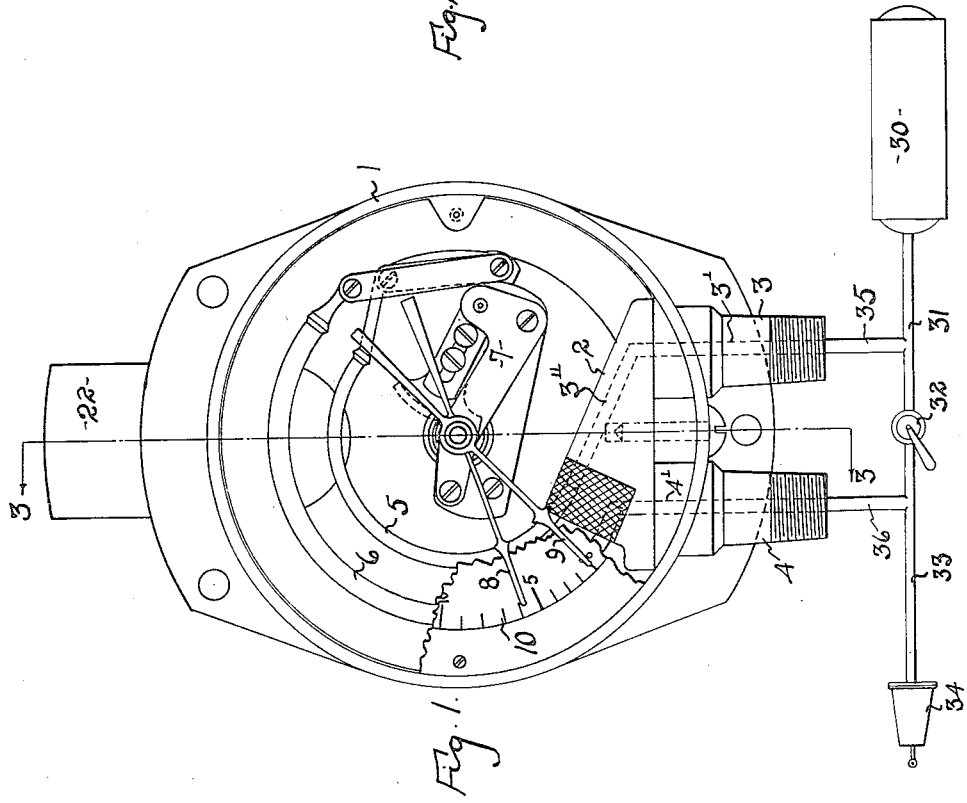
Figure 1 is a front elevational view of a duplex pressure gauge with the front cover removed and a portion of the dial broken away together with a minimum pressure indicator and a piping system of a type with which the pressure gauge and indicator may be used.

As will be apparent from Figure 1, Bourdon tube 5 is always connected to the fluid pressure source so that hand 8 of the gauge gives a continuous indication of the pressure conditions within the source. Bourdon tube 6 is connected to pipes 33 which represent the brake line extension to the brake cylinder or cylinders. With valve 32 in the position shown so that pipe 33 is open to exhaust and pipe 31 is closed, there is or should be no pressure in the brake line 33 above atmospheric pressure so that hand 9 indicates no pressure. When valve 32 is operated to connect pipe 33 to pipe 31, hand 9 will indicate the fluid pressure in pipe 33 being supplied to the brake cylinder. However, when under the former condition of the brakes released and valve 32 in the position shown, there should be any pressure in pipe 33 due to leakage of valve 32 or any other course, the slight resulting pressure which is usually the order of two pounds above atmospheric pressure will act through pipe 36, passage 4', passage 17 and chamber 16 to cause piston 19 to rise and project the vane 22 into the position shown in Figure 1. This indicates to the operator of the vehicle that although his brake valve is in brake released position, there is a slight pressure in the brake cylinder due to some cause such as a leaky brake valve and he is then in a position to see that this undesired condition is corrected. This condition is undesired because even a slight pressure in the brake cylinder will cause a slight application of the brakes, thereby causing undue wear on the brake shoes creating a heated condition of tires, which, in the past, in many cases, has caused loose tires with the result that the tires came off wheel center, thereby causing wrecks.

In order to prevent any possibility of confusion, it should be noted that the vane 22 will of course be in the position shown in Figure 1 when the brakes are applied since cylinder 19 is always connected to passage 4'. However, if the braking system is in correct condition, vane 22 will not project as shown in Figure 1 but will be in the position shown in Figures 2 and 3 when the brakes are released.

From the above description it will be apparent that this invention is not limited to a duplex gauge nor is it limited for use with a vehicle braking system such as shown in the drawing and described for the sole purpose of illustrating this invention.

Since those skilled in the art will readily appreciate other ways and other physical structures for carrying out this invention, we do not desire to be strictly limited to this disclosure as given with a view to disclosing this invention, but rather to the scope of the appended claim.

What we seek to secure by United States Letters Patent is:

As an article of manufacture a fluid pressure indicating device comprising a casing, at least one indicating hand within said casing, fluid pressure operated mechanism insensitive to low pressures within said casing for operating said hand, a movable indicating vane, a cylinder and piston mounted on said casing and connected to said vane for indicating said low pressures and means interconnecting said cylinder and fluid pressure operated mechanism whereby fluid pressure will be simultaneously supplied to both.

JAMES C. McMULKIN.
PHILIP M. HAMMETT.